UNITED STATES PATENT OFFICE.

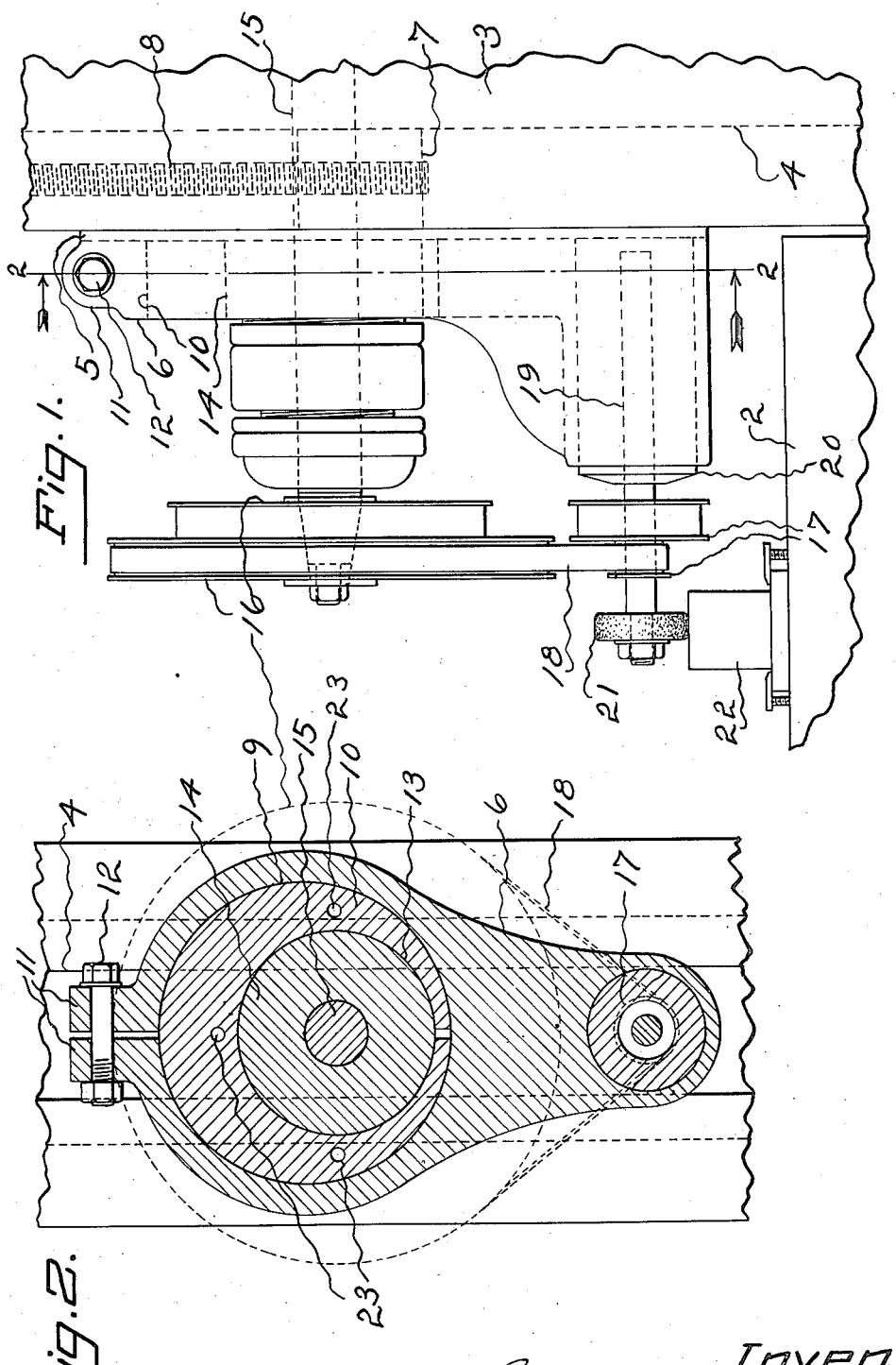

ISRAEL C. PUTNAM, OF EAST HARTFORD, CONNECTICUT, ASSIGNOR OF ONE-HALF TO HARRY C. COLLORD, OF SPRINGFIELD, MASSACHUSETTS.

GRINDING-MACHINE.

1,323,490.   Specification of Letters Patent.   Patented Dec. 2, 1919.

Application filed September 27, 1918. Serial No. 255,905.

*To all whom it may concern:*

Be it known that I, ISRAEL C. PUTNAM, a citizen of the United States, residing at East Hartford, in the county of Hartford and State of Connecticut, have invented certain new and useful Improvements in Grinding-Machines, of which the following is a specification.

This invention relates to grinding-machines and especially to mechanism for tightening a belt. There is a type of grinding-machine comprising two shafts, each equipped with a pulley adapted to be belted together. In such a machine, involving this type of drive, the belt becomes lax and it is practically impossible at the present time, so far as I am aware, to obtain under such circumstances, the tightening of the belt and as a consequence, the proper drive. I provide a construction which is compact and which can in a simple, effective and easy way, tighten such a belt, in order for instance, to insure proper transmission of power from one of these pulleys to the other.

In the drawing accompanying and forming part of the specification I show in detail a form of embodiment of the invention, which I will set forth fully in the following description. I am not limited, however, to this particular disclosure; I may depart therefrom in several respects within the scope of the invention defined of the claims following said description.

Figure 1 is an elevation of parts of a grinding-machine involving the invention.

Fig. 2 is a cross section on the line 2—2 of Fig. 1 looking in the direction of the arrow.

Like characters refer to like parts in both views.

The framework for sustaining the various parts of the machine may be of any suitable character. That shown comprises the base or bed 2 and the column or standard 3. Although the latter is disposed vertically, this may not always be necessary. Said column has a suitable way as 4 to receive for sliding longitudinal movement, the gib or tongue 5 of the bearing or carrier 6. This bearing member 6 may be moved longitudinally of the column 3 in any desirable way.

As shown, the bearing 6 has a threaded extension 7, which is engaged by the screw, 8. This screw is immovable in the direction of its axis of rotation and it therefore follows that upon the rotation of the screw, the bearing member 6 and the parts associated therewith will be raised or lowered depending upon the direction in which the screw is turned.

Said bearing member 6 has a circular opening or pocket to receive an actuator as 10, in the form of an eccentric or cam. The bearing member 6 fits around said eccentric or cam and is provided with ears or lugs, 11, perforated to receive the bolt 12, the nut and head of which are adapted to draw the lugs 11 together so as to clamp said bearing member to or upon the cam or eccentric 10. This cam or eccentric 10 has a circular and eccentrically disposed opening 13, which is adapted to closely receive the disk 14 through the center of which extends the main shaft 15. Said shaft 15 freely turns in this disk 14, the shaft 15 as shown having fastened thereto at its outer end a pulley as 16, coöperative with a smaller cone pulley as 17. Each of the cone pulleys is shown as having two steps, the larger section of the cone pulley 16, as illustrated, being connected as by a belt 18 with the smaller step of the cone pulley 17. The cone pulley 16 turns with the shaft 15 as already described, the cone pulley 17 being rigid with the shaft 19 so as to turn therewith. The shaft 19, as shown is supported for rotation in the bearing box 20, supported at the lower end of the bearing member 6. The shaft 19 has suitably fastened to it a reducing member as the grinding-wheel 21, of comparatively small diameter which is adapted to act upon work as 22, clamped or otherwise suitably attached to the base or bed 2. To facilitate the turning of the eccentric or cam 10 it may, as shown, be furnished with a series of spanner holes 23.

In Figs. 1 and 2 the parts are shown as occupying their normal or working conditions, the tool 21 being positioned to reduce the work. It will be assumed that it is desired to tighten the belt 18. In this event the following procedure will be adopted: First of all the nut of the bolt 12 will be loosened sufficiently to permit the bearing member 6 to free the inclosed eccentric 10. When this is done a spanner will be introduced into two of the holes 23 of the cam 10, when said cam will be turned, thus turning the inclosed bearing or disk 14 therewith, which in the present case moves downward and as a consequence imparts a corresponding downward movement to the bearing or carrier 6 and its shaft 15 and as a result lowers as shown, the pulley 17 and consequently tightens the belt 18, the movement being continued until the slack is eliminated. It will of course be understood that during this action the work of whatever character it may be is not in position. When the slack in the belt has been removed the nut of the bolt 12 is set, thus drawing the bearing member 6 into clamping engagement with the cam or eccentric 10 and maintaining substantially the adjustment.

While I use stepped or cone pulleys for transferring power, this obviously, may not be necessary in all cases nor is it essential that I provide the type of bearings shown, as I may utilize others of different kinds. I have already called attention to the fact that the adjustment of the bearing 6 or its equivalent is in a downward direction. While this is desirable it may not always be required.

What I claim is:

1. In a grinding machine, the combination of a longitudinally adjustable bearing, a shaft supported by said bearing and provided with a pulley, a turnable member in the bearing, the latter having means to hold the same in fixed relation to said turnable member, said turnable member having an eccentric pocket, a second bearing turnable in said pocket, and a shaft extending through the second bearing and provided with a pulley to coöperate with the other pulley.

2. In a grinding machine, the combination of a bearing furnished with an extension, rotary screw immovable in the direction of its axis of rotation and in threaded engagement with said extension, a shaft supported by said bearing and provided with a pulley, a circular turnable member in said bearing having a circular pocket disposed eccentrically with respect thereto, a circular bearing in said circular pocket, and a shaft extending through said circular bearing and provided with a pulley to coöperate with said other pulley.

3. In a grinding machine the combination of a bearing, a shaft supported by said bearing and provided with a pulley, a circular turnable member in said bearing, having a circular pocket disposed eccentrically with respect thereto, a circular bearing in said circular pocket, a shaft extending through said circular bearing and provided with a pulley to coöperate with said other pulley, the first mentioned bearing being divided in proximity to said turnable member and being equipped with perforated lugs, and a bolt extending through the perforations of the lugs, the bolt having a nut, its head being adapted to engage one of the lugs and its nut the other, to clamp said first mentioned bearing upon said turnable member.

In testimony whereof I affix my signature in the presence of two witnesses.

ISRAEL C. PUTNAM.

Witnesses:
J. B. ENGLISH,
JOHN P. REYNOLDS.